(12) United States Patent
Kravchenko et al.

(10) Patent No.: US 12,583,150 B2
(45) Date of Patent: Mar. 24, 2026

(54) FABRICATION AND COMPONENT FUSION PROCESS UTILIZING HEATING AND COMPACTION OF COMPONENTS IN A GRANULAR SUPPORT MEDIUM

(71) Applicant: Old Dominion University, Norfolk, VA (US)

(72) Inventors: Oleksandr G Kravchenko, Yorktown, VA (US); Jimesh Bhagatji, Norfolk, VA (US)

(73) Assignee: Old Dominion University, Norfolk, VA (US)

( * ) Notice: Subject to any disclaimer, the term of this patent is extended or adjusted under 35 U.S.C. 154(b) by 86 days.

(21) Appl. No.: 18/775,137

(22) Filed: Jul. 17, 2024

(65) Prior Publication Data

US 2025/0026048 A1    Jan. 23, 2025

Related U.S. Application Data

(60) Provisional application No. 63/527,157, filed on Jul. 17, 2023.

(51) Int. Cl.
B29C 65/02        (2006.01)
B29C 43/18        (2006.01)
(Continued)

(52) U.S. Cl.
CPC .............. B29C 43/36 (2013.01); B29C 43/18 (2013.01); B29C 43/203 (2013.01); B29C 43/52 (2013.01); B29C 65/565 (2013.01); B29C 67/0037 (2013.01); B32B 5/02 (2013.01); B32B 5/12 (2013.01); B32B 5/26 (2013.01);
(Continued)

(58) Field of Classification Search
CPC ........ B29C 2043/106; B29C 2043/189; B29C 2043/3205; B29C 43/52; B29C 65/02; B29C 65/56; B29C 65/565; B29C 65/70; B29C 67/0037
USPC ............. 264/248, 313, 320; 156/182, 308.2; 29/525
See application file for complete search history.

(56) References Cited

U.S. PATENT DOCUMENTS 2,362,430 A  *  11/1944  Buerger ................. C04B 32/00
                                                              264/320
4,755,343 A  *  7/1988  Kromrey ................. C08K 3/08
                                                              419/68
(Continued)

*Primary Examiner* — Leo B Tentoni

(57)                    ABSTRACT

Disclosed herein is a method of fabrication used in conjunction with simplified fabrication process such as sheet cutting or additive material manufacturing which can cure many deficiencies of laminar bonding or assembly processes including curing of micro-voids or delamination between layers of a component, as well as enabling the combination of components to form a more complex assembly. This method includes the steps of: providing a first component having been formed of a plurality of planar layers; providing a compaction vessel; providing a granular support medium to the interior of the compaction vessel; placing the first component into the granular support medium within the compaction vessel so as to fully encompass the first component or component assembly; heating the granular support and the primary component within the compaction vessel; and applying a compaction force so as to bond or re-fuse the planar layers together.

16 Claims, 14 Drawing Sheets

504

Before
508

512
504
502

After 512
504
502

(51) Int. Cl.

| | |
|---|---|
| *B29C 43/20* | (2006.01) |
| *B29C 43/36* | (2006.01) |
| *B29C 43/52* | (2006.01) |
| *B29C 65/56* | (2006.01) |
| *B29C 65/70* | (2006.01) |
| *B29C 67/00* | (2017.01) |
| *B32B 5/02* | (2006.01) |
| *B32B 5/12* | (2006.01) |
| *B32B 5/26* | (2006.01) |
| *B32B 27/12* | (2006.01) |
| *B32B 27/18* | (2006.01) |
| *B33Y 40/20* | (2020.01) |
| *B29C 43/10* | (2006.01) |
| *B29C 43/32* | (2006.01) |
| *B29K 21/00* | (2006.01) |
| *B29K 105/08* | (2006.01) |
| *B29K 105/14* | (2006.01) |

(52) U.S. Cl.
CPC .............. *B32B 27/12* (2013.01); *B32B 27/18* (2013.01); *B33Y 40/20* (2020.01); *B29C 2043/106* (2013.01); *B29C 2043/189* (2013.01); *B29C 2043/3205* (2013.01); *B29K 2021/003* (2013.01); *B29K 2105/0881* (2013.01); *B29K 2105/14* (2013.01); *B32B 2260/023* (2013.01); *B32B 2260/046* (2013.01); *B32B 2262/106* (2013.01)

(56) References Cited

U.S. PATENT DOCUMENTS

| | | | | |
|---|---|---|---|---|
| 5,160,677 A | * | 11/1992 | Gravener | A61B 17/0643 |
| | | | | 264/320 X |
| 10,703,025 B1 | * | 7/2020 | Biesboer | B29C 65/56 |
| 2013/0136945 A1 | * | 5/2013 | Charest | B29C 43/52 |
| | | | | 72/364 |
| 2020/0238638 A1 | * | 7/2020 | Toriyama | B29C 43/56 |

* cited by examiner

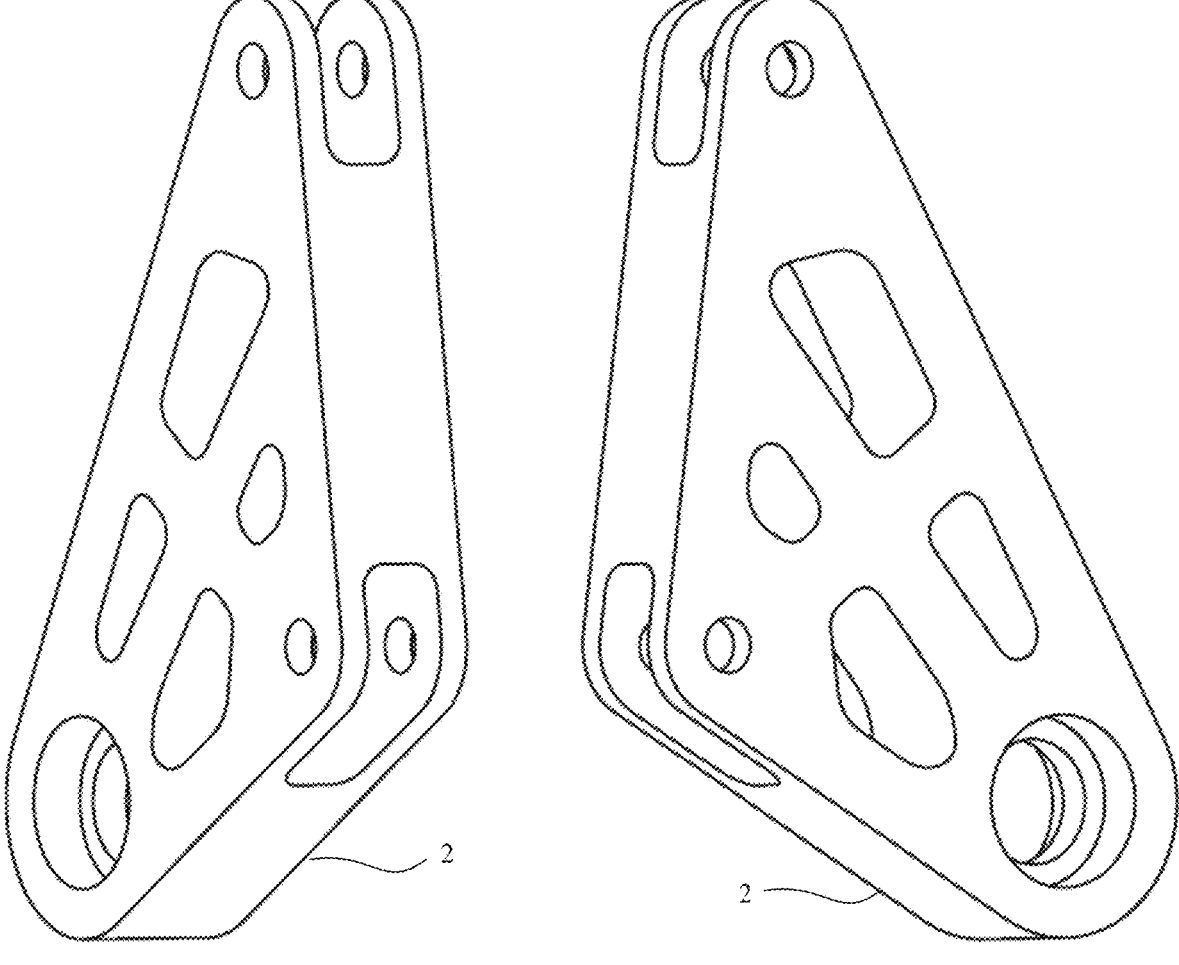
FIG. 1A                    FIG. 1B
PRIOR ART                  PRIOR ART

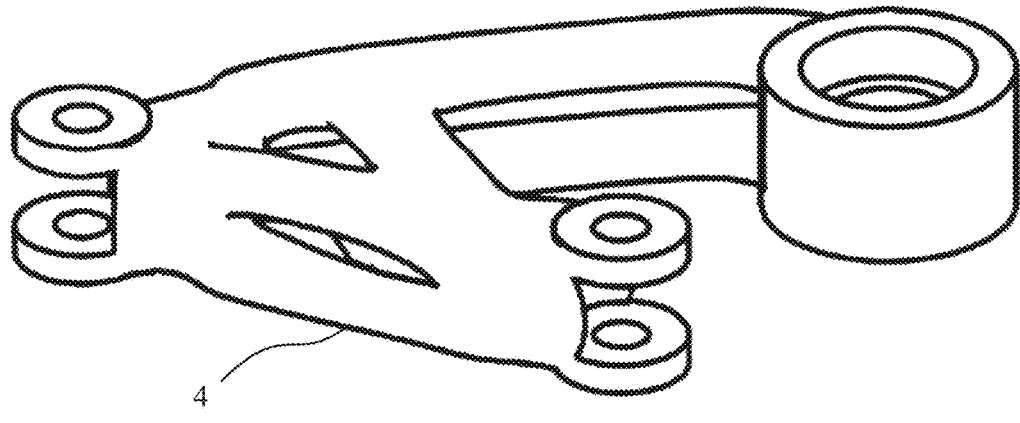
FIG. 2A
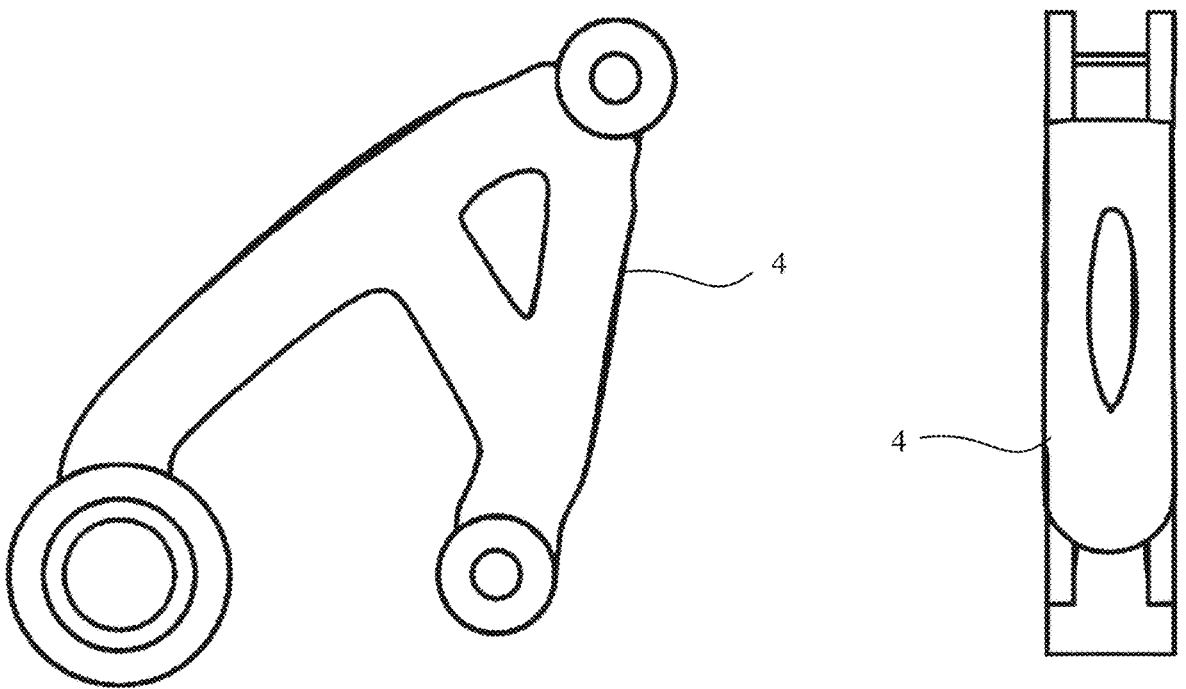
FIG. 2B
FIG. 2C

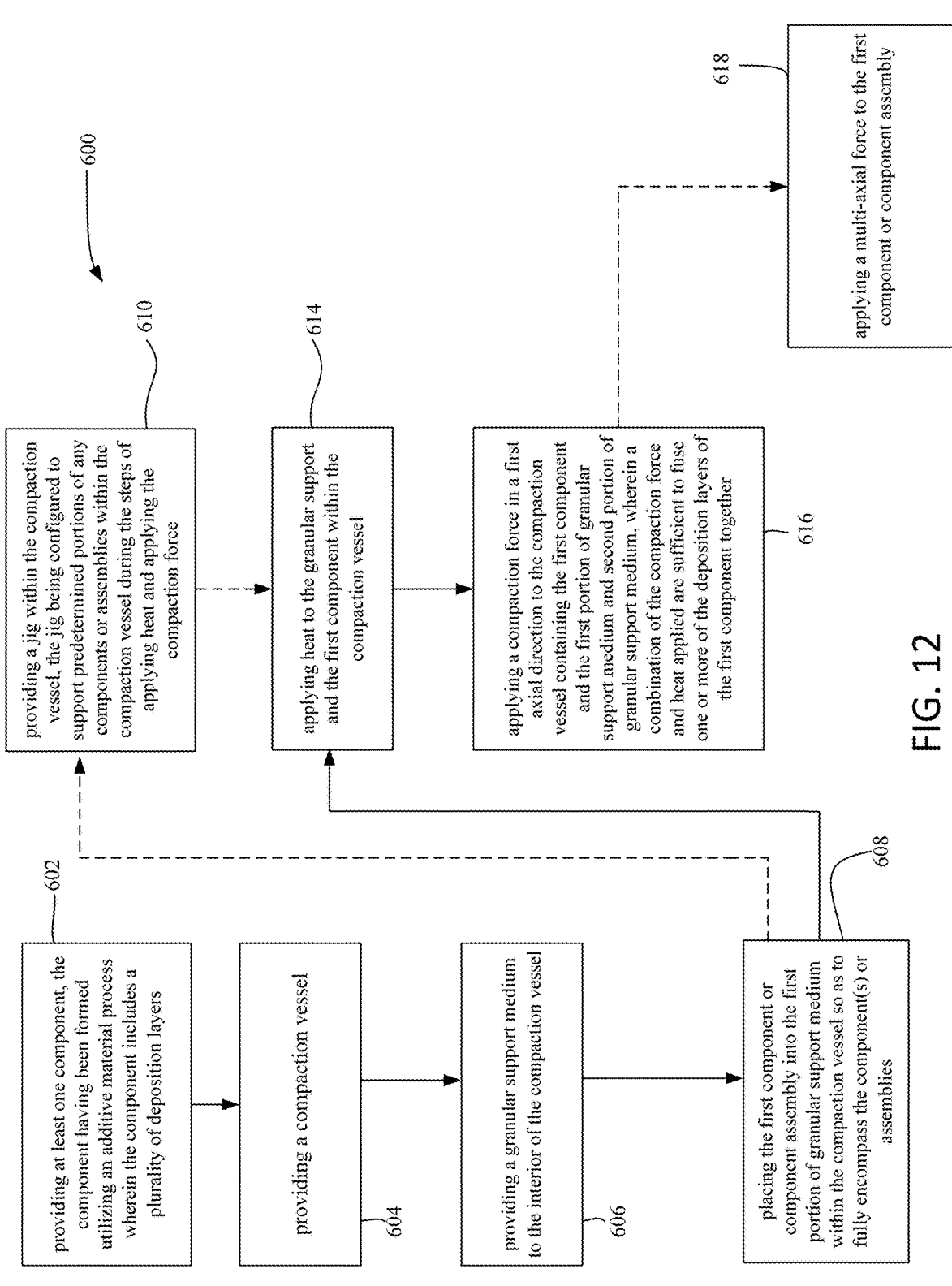

602 — providing at least one component, the component having been formed utilizing an additive material process wherein the component includes a plurality of deposition layers 604 — providing a compaction vessel 606 — providing a granular support medium to the interior of the compaction vessel 608 — placing the first component or component assembly into the first portion of granular support medium within the compaction vessel so as to fully encompass the component(s) or assemblies 610 — providing a jig within the compaction vessel, the jig being configured to support predetermined portions of any components or assemblies within the compaction vessel during the steps of applying heat and applying the compaction force 614 — applying heat to the granular support and the first component within the compaction vessel 616 — applying a compaction force in a first axial direction to the compaction vessel containing the first component and the first portion of granular support medium and second portion of granular support medium, wherein a combination of the compaction force and heat applied are sufficient to fuse one or more of the deposition layers of the first component together 618 — applying a multi-axial force to the first component or component assembly

FABRICATION AND COMPONENT FUSION PROCESS UTILIZING HEATING AND COMPACTION OF COMPONENTS IN A GRANULAR SUPPORT MEDIUM

CROSS-REFERENCE TO RELATED APPLICATIONS

The present application is a continuation of, and claims priority to, U.S. provisional patent application No. 63/527, 157 filed on Jul. 17, 2023, the disclosure of which is hereby incorporated by reference in its entirety.

COPYRIGHT STATEMENT

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

FIELD OF THE INVENTION

The present disclosure generally relates to the field of simplified sub-manufacturing techniques such as traditional or additive manufacturing or stamping or sheet cutting of planar materials.

BACKGROUND OF THE INVENTION

Additive manufacturing, also known as 3D printing, is a process wherein a component to be fabricated are formed by iteratively laying down multiple thin layers or two-dimensional slices of the component. This method has become largely popular for its ability to produce prototype components in a relatively short amount of time while eliminating waste inherent in traditional machining and also without requiring the use of specific tooling for molding type processes. However, such components formed via 3D printing often have reduced ability for use in actual structural application due to various limitations inherent in forming a component in this manner.

Due to known drawbacks inherent in typical additive manufacturing processes, components formed utilizing these additive manufacturing processes often have limited structural function due to tendencies of the final components to have flaws such as incompletely bonded layers, voids, or the limitation in strength of the interlayer bonding. Further, 3D printer heads are typically designed to move in a two-dimensional plane which creates manufacturing induced defects and limitations with regard to how filament can be deposited on the printed component, and orientation of embedded fibers, etc. Additionally, the invention relates to the use of components and assemblies utilizing components which are stamped or cut from sheet or laminated materials and assembled into assemblies with more complex geometries.

SUMMARY OF THE INVENTION

In order to mitigate or solve the aforementioned as well as and many other additional problems relating to the afore-mentioned manufacturing techniques it has been recognized by the inventors and will be discussed herein, that in various instances, manufactured components as well as assemblies which are formed of a number of planar parts can be provided with greatly increased strength if the formed component can be better fused together in a manner which provides increased interlayer or intercomponent bonds.

In order to achieve this, contemplated herein is a system for and method of manufacturing which can include systems configured to perform the steps of: providing a first component, the first component having been formed utilizing laminated sheets or an additive material process wherein the first component can include plurality of laminate or deposition layers; providing a compaction vessel; providing a granular support medium to the interior of the compaction vessel; placing the first component into the granular support medium within the compaction vessel; providing a second portion of granular support medium to the interior of the compaction vessel so as to fully encompass the first component; applying heat to the granular support and the first component within the compaction vessel; and applying a compaction force in a first axial direction to the compaction vessel containing the first component and the granular support medium, wherein a combination of the compaction force and heat applied are sufficient to fuse one or more of the planar or deposition layers of the first component together.

In some embodiments, the method and system can be configured in such a manner that the step of applying heat is performed such that the temperature within the compaction vessel is increased to or above the melting point of a material from which the first component is formed.

In some embodiments, the granular support medium can be provided as a powder, such as talcum powder, or natural or fabricated ceramic grains.

In some alternative embodiments, the granular support medium can be provided as ball bearings or other types of spherical grains, such as fabricated ceramic or metal.

In some embodiments it has been recognized that certain advantages are realized when the granular support medium is formed of a material which has a melting temperature being greater than a melting point of a material utilized to form the any components contained therein.

In some embodiments the compaction force can be provided utilizing a hydraulic press, however any means of applying a first axial force would be acceptable.

In some exemplary embodiments, the compaction vessel can be provided so as to include one or more sloped or otherwise contoured internal surfaces. In some such embodiments, one or more wedges can be provided which have opposing surfaces which correspond in shape to the sloped or contoured internal surfaces such that the step of providing a compaction force causes the wedges to apply a multi-axial compressive pressure through the granular support medium which is then transferred to the first component contained therein by applying a more uniform densification.

In some additional embodiments, the method and system can include a jig, which can be provided within the compaction vessel, the jig being configured to support predetermined portions of the first component within the compaction vessel during the steps of applying heat and applying the compaction pressure. In some such embodiments, the jig can include various support structures. In some such embodiments, or independently from the jig, the system can include one or more support rods extending to or from an interior surface of the compaction vessel, the support rods being configured to maintain a relative position of a portion of the first component, second component, or component assembly.

In some alternative exemplary embodiments, an interior surface of the compaction vessel can be provided such that the interior surface is contoured so as to provide desired support attributes to predetermined portions of the first component within the compaction vessel during the steps of applying heat and applying the compaction force.

In yet additional embodiments, the method can include a step of providing a second component, the second component including a plurality of laminate or deposition layers; interfacing the second component with the first component so as to form a component assembly wherein the plurality of laminate or deposition layers of the first component are oriented differently from the plurality of planar or deposition layers of the second component; and placing the component assembly into the granular support medium within the compaction vessel prior to the providing of the second portion of granular support medium. In some such embodiments the applying heat and applying of the compaction force can then be utilized to fuse the first component and the second component together so as to cause the component assembly to become unitary.

This fusing or re-fusing between laminate layers can thus impart high bonding strength, heal incompletely bonded additive layers, and remove voids which can remain after manufacturing of the component, particularly for the additive manufactured components. Further, the fusing between various differently oriented planar layers can allow for an increased assembly strength between differently oriented components ensuring a more uniform bond.

BRIEF DESCRIPTION OF THE DRAWINGS

In order to clearly illustrate various embodiments of the disclosure, the following section provides a brief description of the attached drawings, which are for illustrative purpose only. For those of ordinary skills in the art, other drawings of other embodiments may become apparent based on these drawings wherein:

FIGS. 1A-B illustrate various perspective views of an exemplary component formed in the fashion of the prior art;

FIG. 2A-C illustrate perspective, side and top views of an exemplary component with highly curvilinear surface geometry which can be imbued with various advantages utilizing the various methods of the present invention;

FIG. 12 illustrates an exemplary flow chart of a method for manufacturing or treating of a previously formed manufactured component in accordance with various aspects of the present invention.

DETAILED DESCRIPTION OF THE INVENTION

Figures 3A, 3B, 3C, 3D, 3E, 3F:
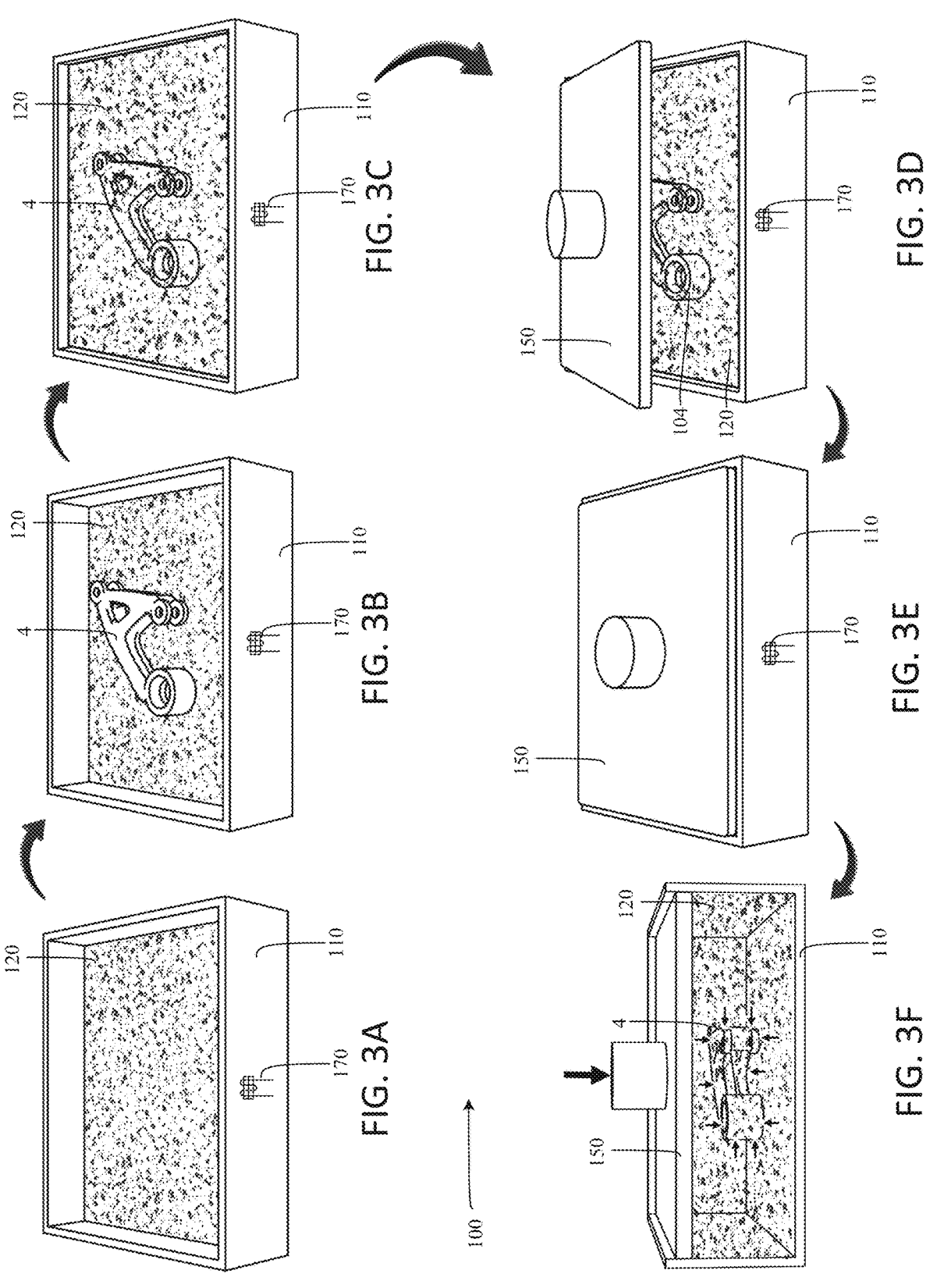
FIG. 3A illustrates a perspective view of an exemplary compaction vessel in accordance with various aspects of the present invention being partially filled with a granular support medium.
FIG. 3B illustrates a perspective view of an exemplary compaction vessel of FIG. 3A having the exemplary curvilinear component of FIGS. 2A-B provided therein on granular support medium.
FIG. 3C illustrates a perspective view of an exemplary compaction vessel of FIG. 3B having the exemplary curvilinear component of FIGS. 2A-B provided therein within an additional portion of granular support medium fully encasing the curvilinear component.
FIGS. 3D-E illustrate a perspective view of an exemplary curvilinear compaction vessel of FIG. 3C having the exemplary curvilinear component of FIGS. 2A-B provided therein within a pressure plate being provided being configured to apply a compaction force to the interior of the compaction vessel.
FIG. 3F illustrates a perspective partial cutaway view of an exemplary compaction vessel of FIGS. 3D-E having the exemplary optimized component of FIGS. 2A-B illustrating the application of a compaction force to the granular support medium and the curvilinear component contained therein.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements may also be present. In contrast, when an element is referred to as being "directly on" or extending "directly onto" another element, there are no intervening elements present.

Likewise, it will be understood that when an element such as a layer, region, or material is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As discussed briefly above, the present invention relates generally to simplified planar or additive manufacturing. It will also be appreciated that typical material techniques for plastic and fiber reinforced plastics are fabricated by means of molding, either compression or injection molding, both of which utilize rigid tooling. However, due to limitations with regard to tool design, the desired architecture of the final part demonstrates the significant limitations with regard to shapes that can be manufactured. Illustrated in FIGS. 1A-B is a typical part 2 that can be produced by the means of molding or other traditional machining. This typical part 2 is illustrated as a rocker for purposes of furthering discussion, however the principles can be applied to virtually any part or component formed in this manner. However, it will be generally understood that a part formed using this manner is often left with excess material which provides little to no functional benefit but is left on the final part due to the manufacturing limitations. Additionally, these pre-existing techniques often result in less efficient material utilization and increased weight of the component, particularly parts being fabricated for manufacturability over performance.

Alternatively, as illustrated in FIGS. 2A-C, which shows a component with complex curvilinear geometry 4 having material only where necessary providing the required strength and rigidity to perform the structural function. This design provides for a greater or more optimal material utilization and reduced weight. The problem arises in the fact that the architecture and design of the curvilinear component would cause this component to be impossible to form utilizing traditional molding or machining techniques. However, as will be well understood in the art, such a component would be relatively easy to form utilizing an additive material process. However, the material properties of such a part are significantly less desirable than would be achieved via molding processes due to manufacturing induced defects during layer-by-layer deposition.

FIG. 3A-F illustrates an exemplary system 100 and method illustrating various structures and methods illustrative of the invention as contemplated herein, which can include systems configured to perform the following steps. Namely: providing a first component, such as the curvilinear component 4 of FIGS. 2A-C, however, as discussed above, this could be provided as any component or assembly formed via additive manufacturing or 3-D printing in which the first component includes a plurality of laminate or deposition layers. The system or method can then include a step of providing of a compaction vessel 110, as shown in FIG. 3A.

In some embodiments, a first portion of granular support medium 120 can be provided into the compaction vessel 110. Once a sufficient amount of granular support medium is provided so as to properly separate the first component 4 from a bottom portion of the compaction vessel 110, the method can then include a step of placing the first component 4 into the first portion of granular support medium 120 within the compaction vessel 110, as shown in FIG. 3B. After placing the first component 4, a second portion of granular support medium can then be added to the interior of the compaction vessel 110 so as to fully encompass the first component 4, as shown in FIG. 3C. It will be further understood that the embedding or encompassing of the component within the compaction vessel can be achieved via any suitable means, such as by suspending the component and then adding the granular support medium, as well as merely embedding the part within the granular support medium already provided within the compaction vessel via shifting, pressing, agitating, or otherwise.

The method can then include a step of applying heat to the granular support 120 which can be achieved by utilizing a heating element 170, which in some exemplary embodiments can be embedded into the structure of the compaction vessel 110. However, it will be appreciated that heat can be applied via numerous methods, including exterior heating, induction, convective, microwave means, or embedding internal heating elements within the granular support.

The heating of the first component 4 within the compaction vessel 110 can be done in conjunction with a step of applying a compaction force in a first axial direction to the compaction vessel containing the first component and the first portion of granular support medium and second portion of granular support medium 120 as illustrated in FIGS. 3D-F. This compaction force is illustrated as being applied via a pressure plate 150, however alternative means of application of force are also contemplated herein, including provision of membranes, air pressure, vacuum, etc. The combination of the compaction force and heat applied need only be sufficient to fuse the planar deposition layers of the component together and optimization of a balance between the heat and the compaction force. To achieve such balance will vary widely depending on materials forming the component 4 and the granular support medium 120. Additionally, in some embodiments the compaction force should be optimized in force and speed of application so as to minimize shift of the component inside of the granular support medium 120 and thus minimize any distortion applied to the component 4 at elevated temperature contained therein.

Figures 4A, 4B:
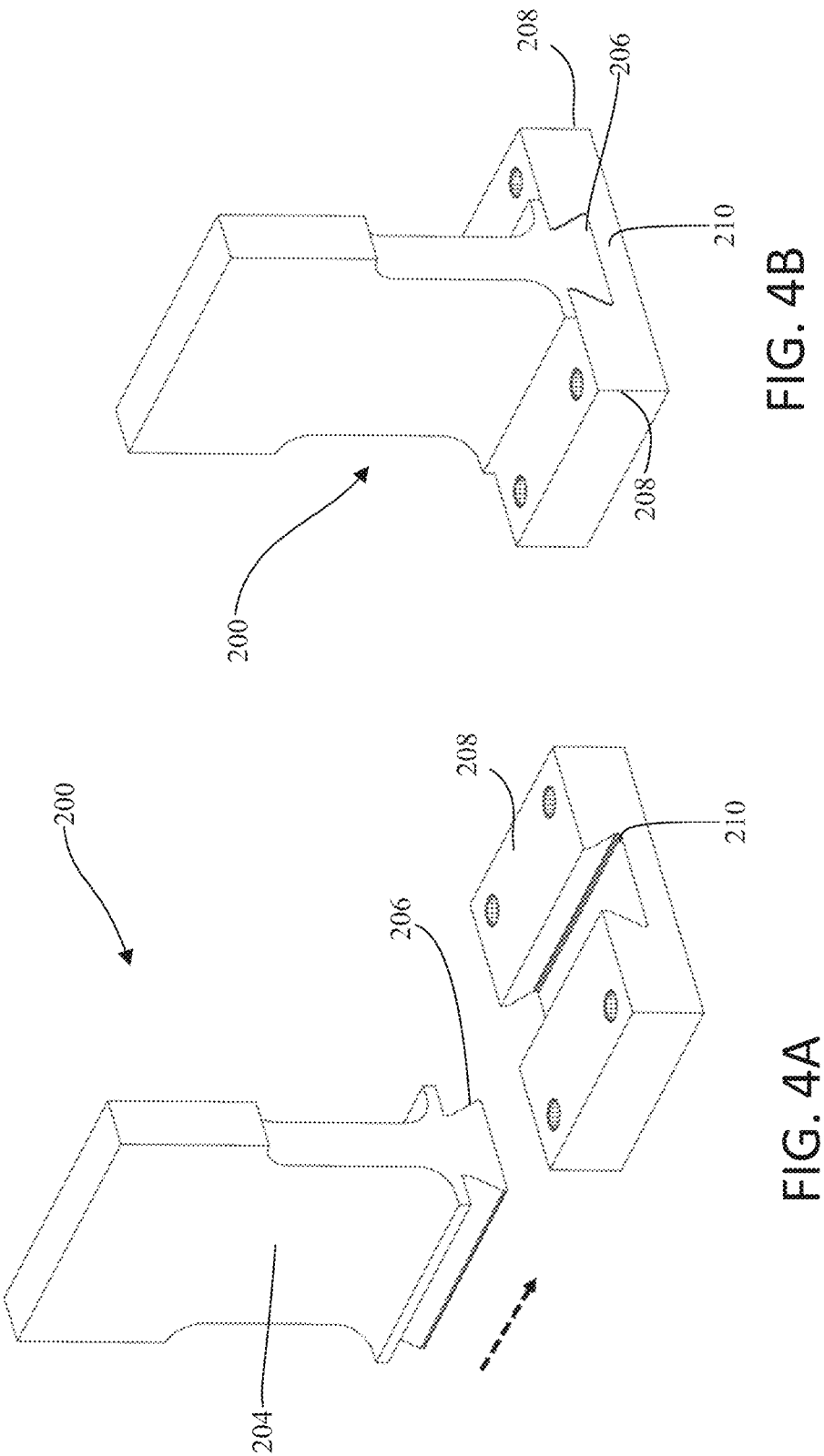
FIGS. 4A-B illustrate perspective views of a plurality of alternative exemplary components which can be assembled to form a component assembly and similarly treated in accordance with the steps illustrated in FIGS. 3A-F.
Figure 5B:
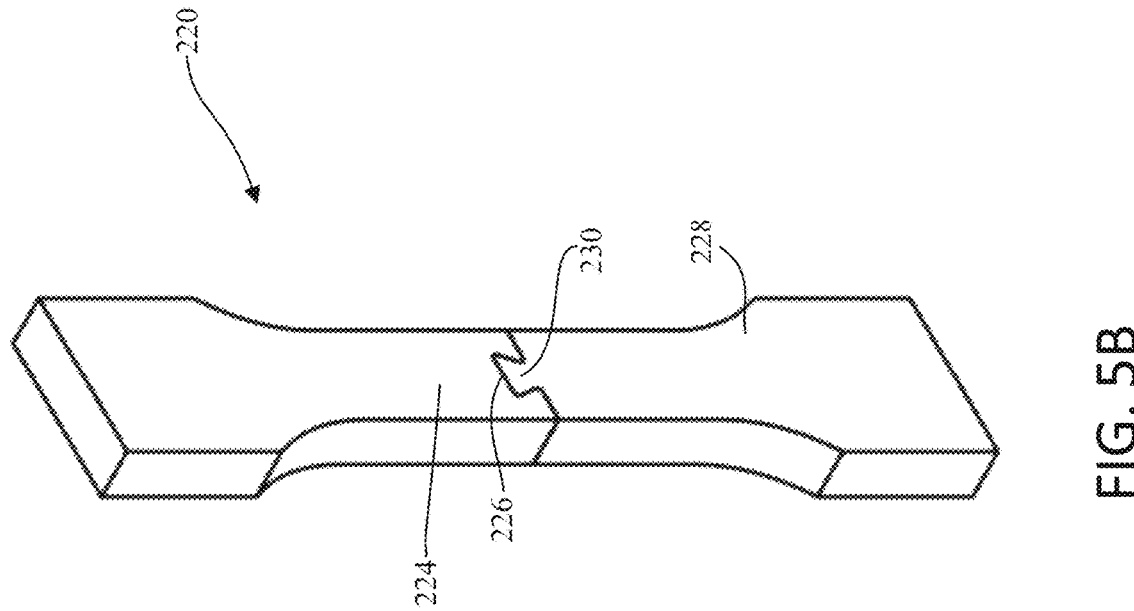
FIGS. 5A-B illustrate perspective views of an alternative plurality of alternative exemplary optimized components which can be assembled to form yet another alternative component assembly and similarly treated in accordance with the steps illustrated in FIGS. 3A-F.
Figure 5A:
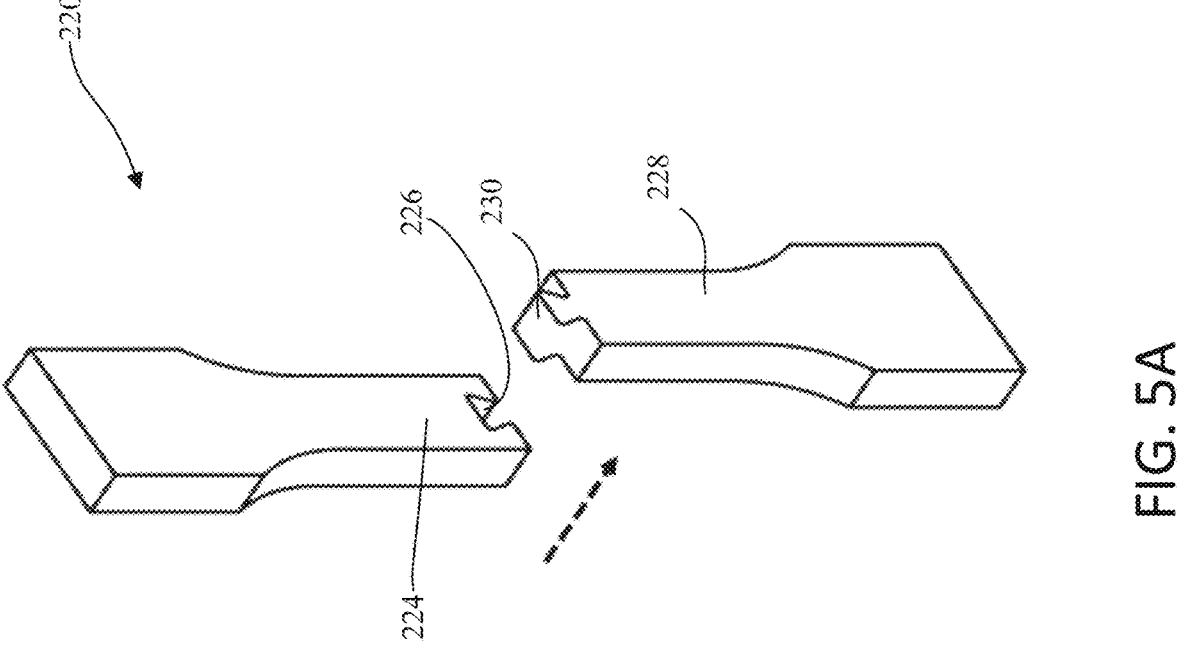

In yet additional embodiments, and as illustrated in FIGS. 4-5, the method can include a step of providing both a first component 204/224 as well as a second component 208/228, the second component 208/228 also having been formed utilizing a plurality of laminate or deposition layers.

In such embodiments, the first and second components can be provided with interfacing surfaces 206/210/226/230, which can be configured to interlock, interfere, or otherwise attach the first component with the second component thus forming a component assembly 200/220. This allows for an ability for the component assembly to have components in which the plurality of planar or deposition layers between the components can be oriented differently from one another in a manner such that the orientation of the planar or deposition layers can be selected for optimal efficiency, strength, or for any other desired reason for having different planar or deposition layer orientations between different portions of a component or component assembly.

Figures 6A, 6B, 6C:
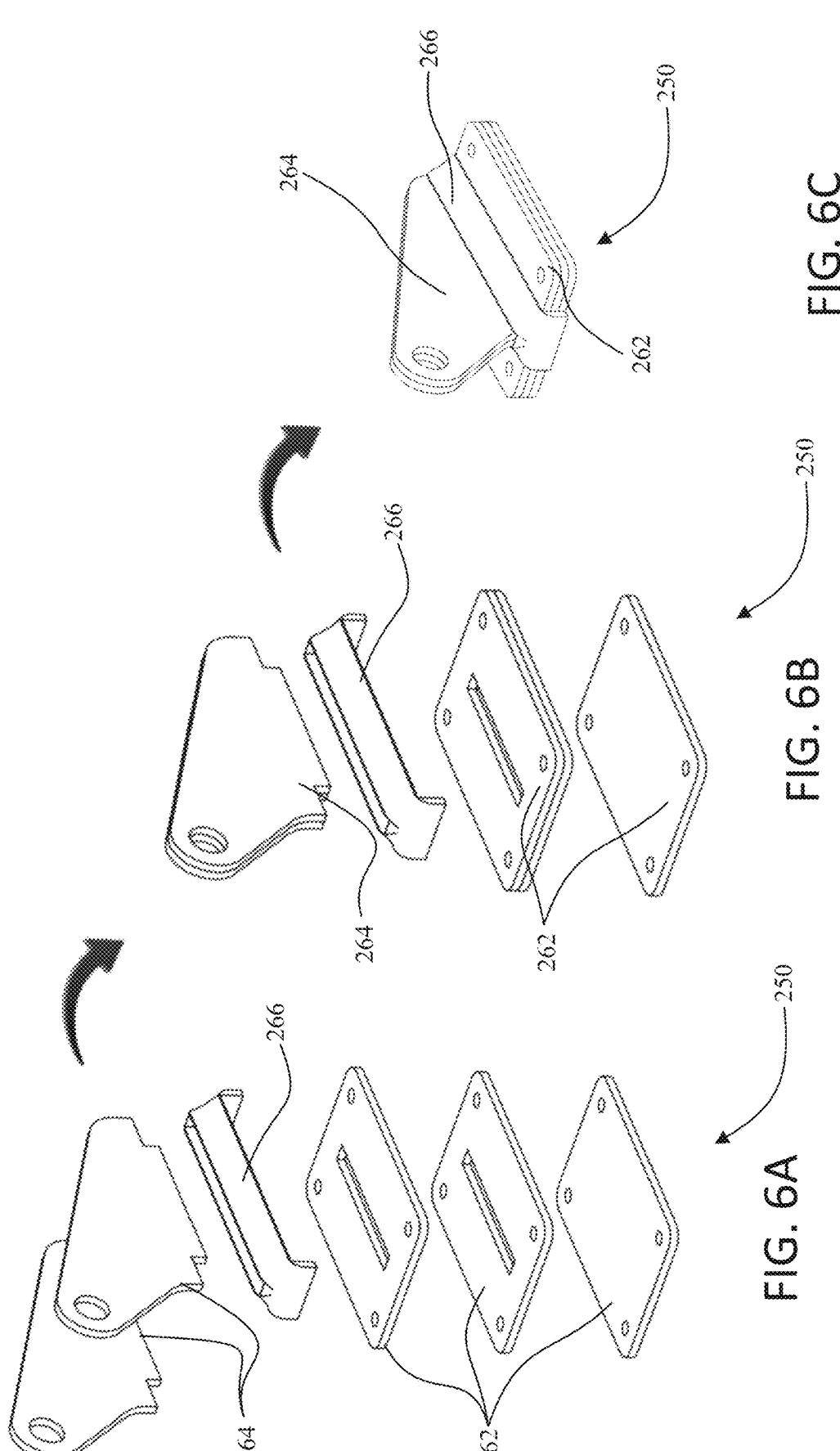
FIGS. 6A-C illustrate perspective views of an exploded, partially assembled, and an assembled state of yet another alternative component assembly and similarly treated in accordance with the steps illustrated in FIGS. 3A-F being further illustrative of various aspects of the present invention.
Figure 7A:
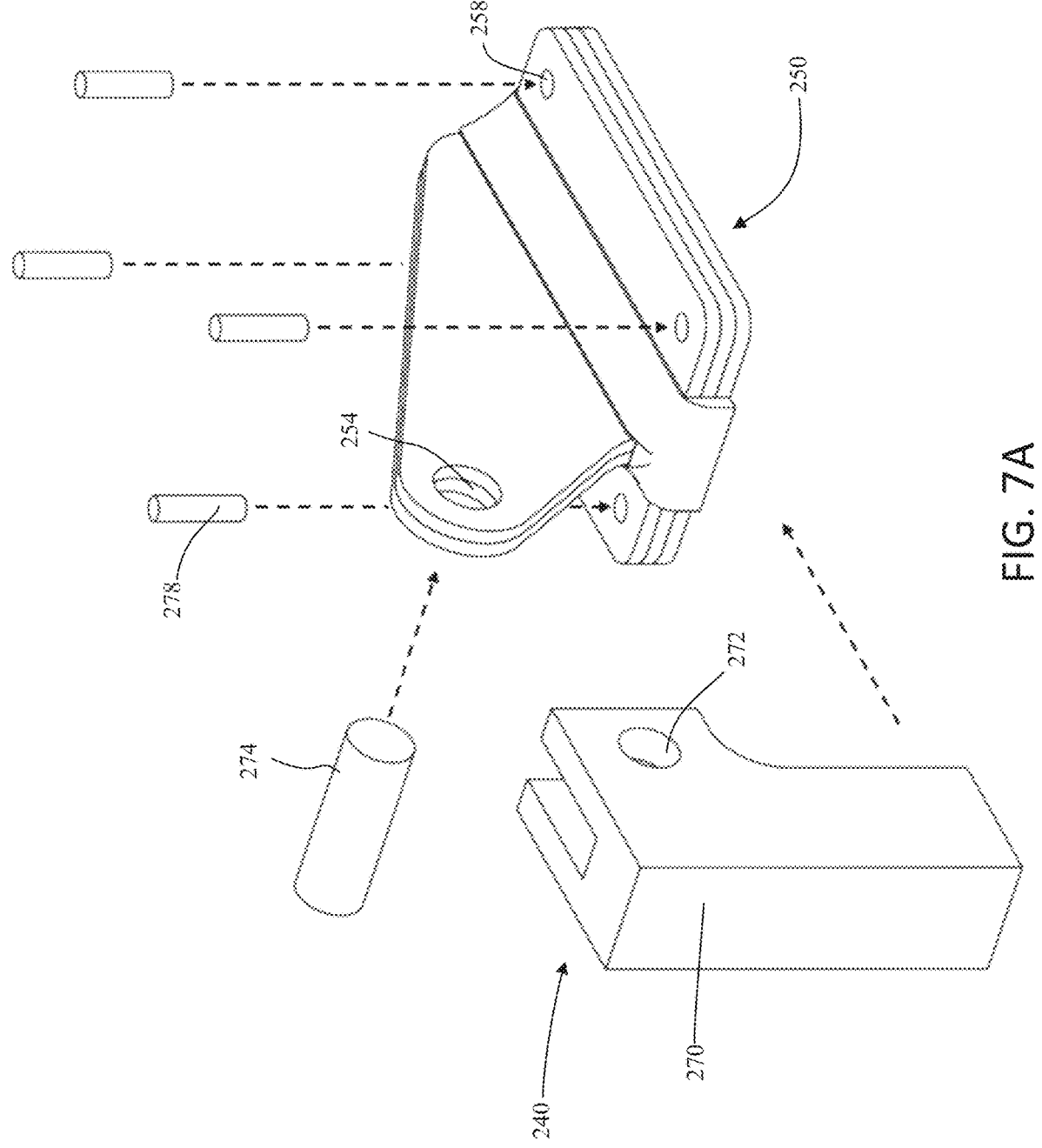
FIGS. 7A-B illustrate perspective exploded and assembled views of a jig and jig components which can be utilized to maintain various dimensions of the particular component assembly of FIGS. 6A-C during the compaction and heating process.
Figure 7B:
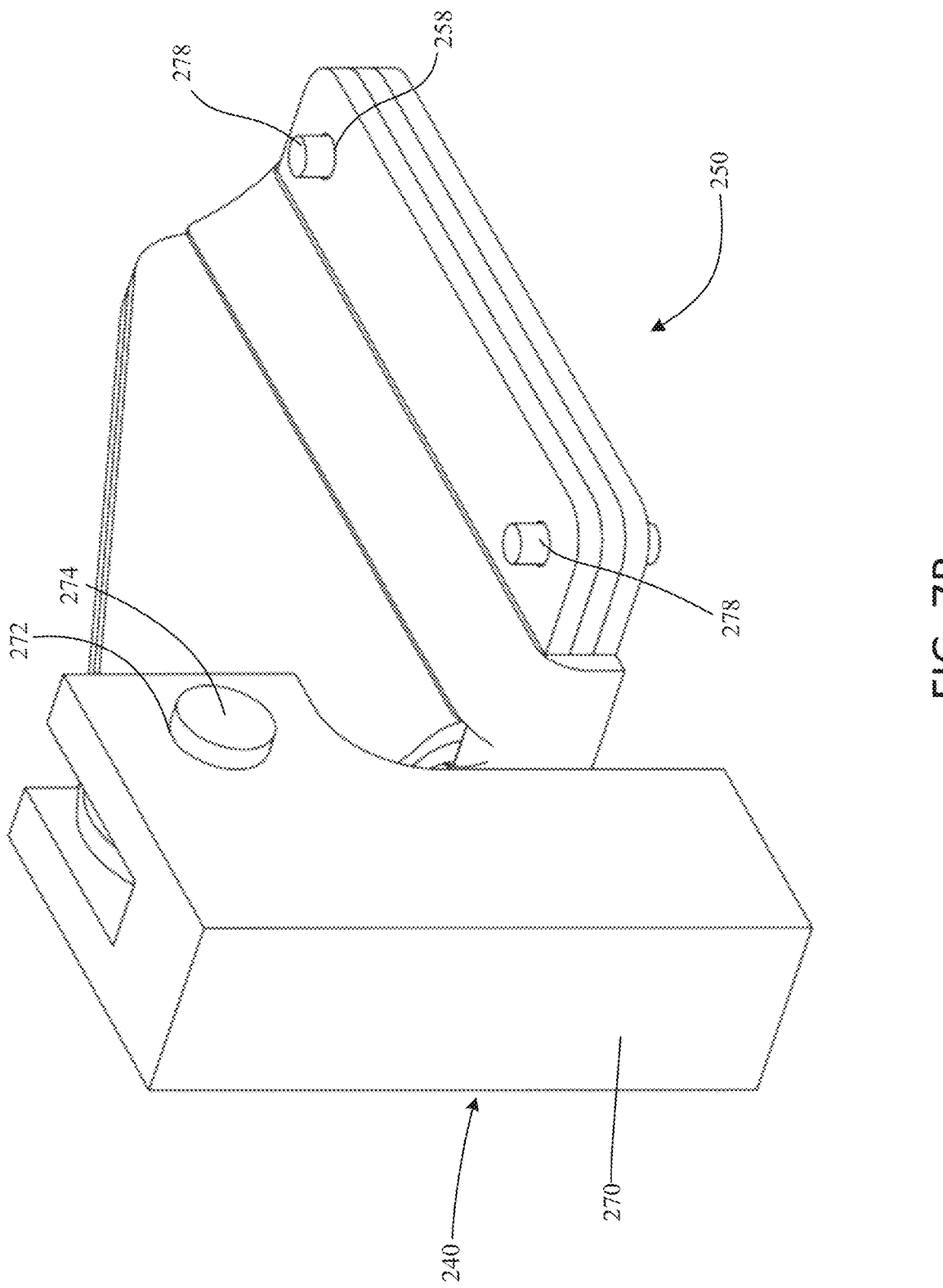

FIGS. 6A-C illustrate yet another example of a component assembly 250 which can be optimally formed utilizing the compaction and heating process contemplated herein. In the embodiment shown here, the component assembly 250 can be comprised of a plurality of easily manufactured individual components which can be fused together by the methods contemplated herein. For example, as shown here, a first or first set of a plurality of planar sheets 262 with corresponding features provided therein and optimally oriented strength or other properties can be provided and stacked in a first orientation wherein each plane of each component in the first set of planar sheets 262 is oriented in a parallel manner one to another. Then another individual or second set of planar sheets 264 can be provided, similarly being provided with corresponding features provided therein for optimally oriented strength or other properties can be provided and stacked in a second orientation wherein each plane of each component in second individual or second set of planar sheets 264 is oriented in a parallel manner one to another but in a different or non-parallel orientation from the first or first set of planar sheets 264. In this embodiment, an optional bracket 266 is shown which can also be provided to increase a bonding area between the first and second set of planar sheets.

It will be appreciated that the planar sheets shown in this or any of the other embodiments can be formed relatively easily, for example using sheet stamping, cutting, or additive manufacturing of sheet materials, which is much easier and faster than typical three dimensional fabrication molding methods and could then provide individual components for an assembly in an efficient and low-cost manner. The ability to then take those planar components and form an assembly therefrom, wherein the assembly of such sheets can then be compressed, heated, and fused together into a unitary assembly would greatly improve the ability to form custom parts without the need for tooling an injection mold, individually machining a part, or be required to deal with the inherent limitations of an additively manufactured part.

In some embodiments, the method and system can be configured in such a manner that the step of applying heat is performed such that the temperature within the compaction vessel is increased to or above the melting point of a material from which the first component is formed.

In some embodiments, the granular support medium 120 can be provided as a powder, such as talcum powder, or natural or engineered ceramic powder grains. Alternatively, some additional embodiments, the granular support medium 120 can be provided as ball bearings or other types of metallic small-scale particles or grains.

In some embodiments it has been recognized that certain advantages are realized when granular support medium 120 is provided which has a melting temperature being greater than a melting point of a material utilized to form the any components 4 contained therein.

In some embodiments the compaction force can be provided utilizing a hydraulic press, however any means of applying a first axial force would be acceptable.

In some exemplary embodiments, and as illustrated in FIGS. 8-9, an alternative system 300 can include an alternative compaction vessel 310 which can also include one or more sloped internal surfaces 312. This compaction vessel 310 can also be provided with a granular support medium 120 encompassing a component or component assembly 250 as illustrated here, however in many of the figures shown herein the granular support medium is omitted so as to show the alternative features of the particular embodiments.

In the particular embodiment illustrated in FIGS. 8-9 one or more wedges 320 can be provided which have opposing surfaces which correspond in shape to the sloped internal surfaces 312 such that the step of providing a compaction force causes the wedges 320 to create a multi-directional state of pressure onto a component contained within the compaction vessel 310, shown as a component assembly 250 in these figures. It will be appreciated based on FIGS. 8-9 that as the pressure plate 350 translates downward in response to the input force, that the force is also translated to the wedges 320 which then travel both downward as well as inward toward the component assembly 250 so as to apply a non-axial force to further compress the granular support medium 120 which applies a corresponding pressure to the component assembly 250. It will be appreciated that this embodiment is illustrative of only one exemplary implementation of providing a secondary or non-axial compaction force and that alternative methods can include providing a secondary pressing direction and a secondary pressure plate pressing in from one of the sidewalls of the compaction vessel.

Additionally, it will be appreciated that numerous heating means can be employed and still reside within the scope of the invention. For example, FIG. 8C illustrates heating elements 372 being embedded in the sidewall of the compaction vessel, while FIGS. 8A-B and FIGS. 9A-E show heating elements 370 extending into the interior cavity in which the granular support medium resides, while not interfering with the component contained therein. It will also be appreciated that the entire compaction vessel could be heated externally by, for example, placing into an oven, onto a separate heating element, by induction heating of the vessel, etc.

In some additional embodiments, the method and system can include a jig or jig assembly 240. The jig or jig assembly 240 is illustrated as being provided within the compaction vessel 310 however this is only an exemplary embodiment, and those having skill in the art will appreciate that a jig could be provided corresponding in shape so as to provide necessary support to any component contained within any of the compaction vessels as contemplated herein. It will then be understood, the jig or jig assembly 240 can be configured to support predetermined portions of the portions of the component assembly 250 within the compaction vessel 310 during the steps of applying heat and applying the compaction force.

Figures 8A, 8B:
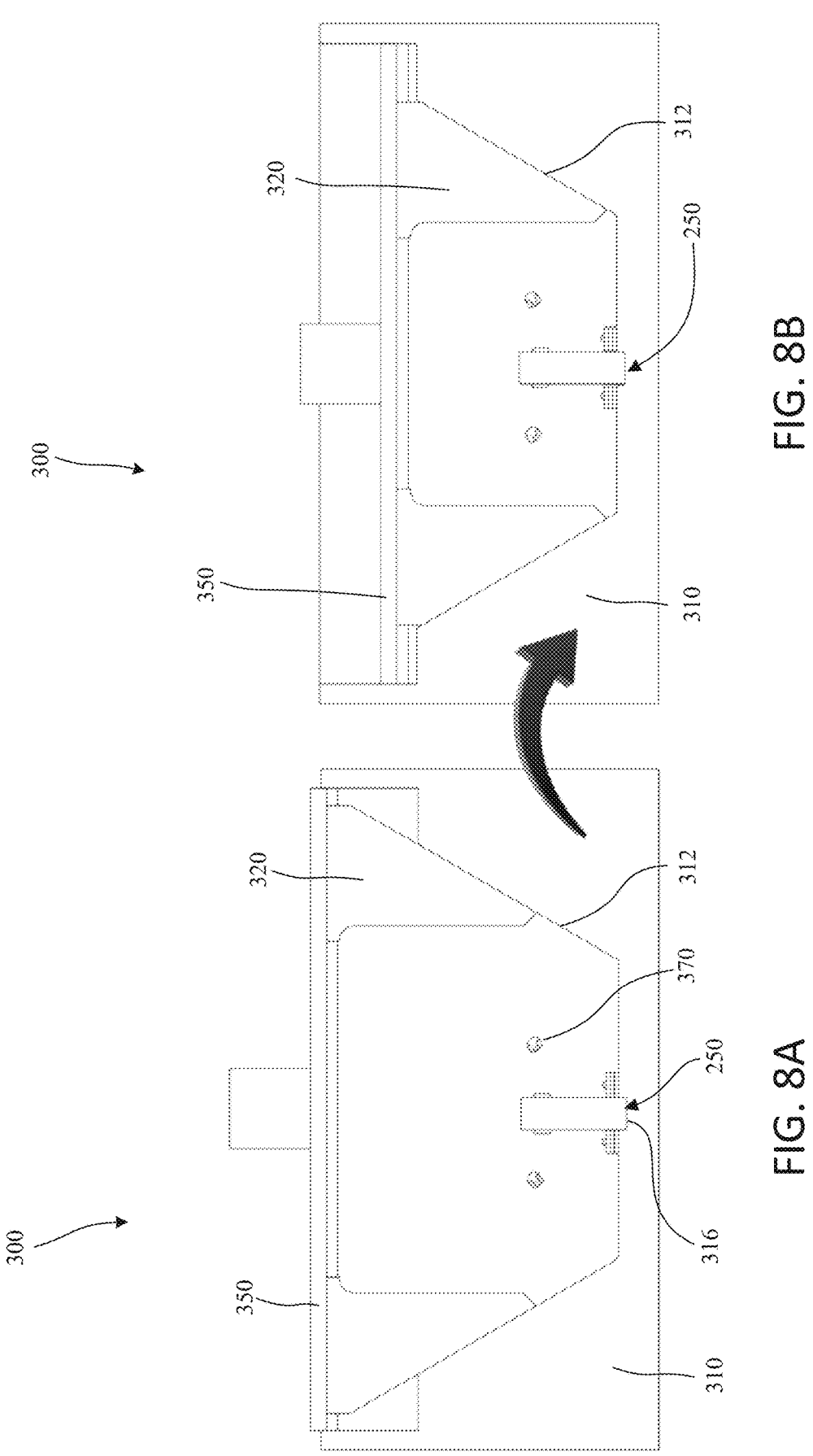
FIGS. 8A-B illustrate side partial cutaway views of the component assembly, jig, and jig components of FIGS. 7A-B as inserted into an alternative compaction vessel in corresponding non-compacted and compacted states, the alternative compaction vessel having various alternative features in accordance with various aspects of the present invention.
Figure 8C:
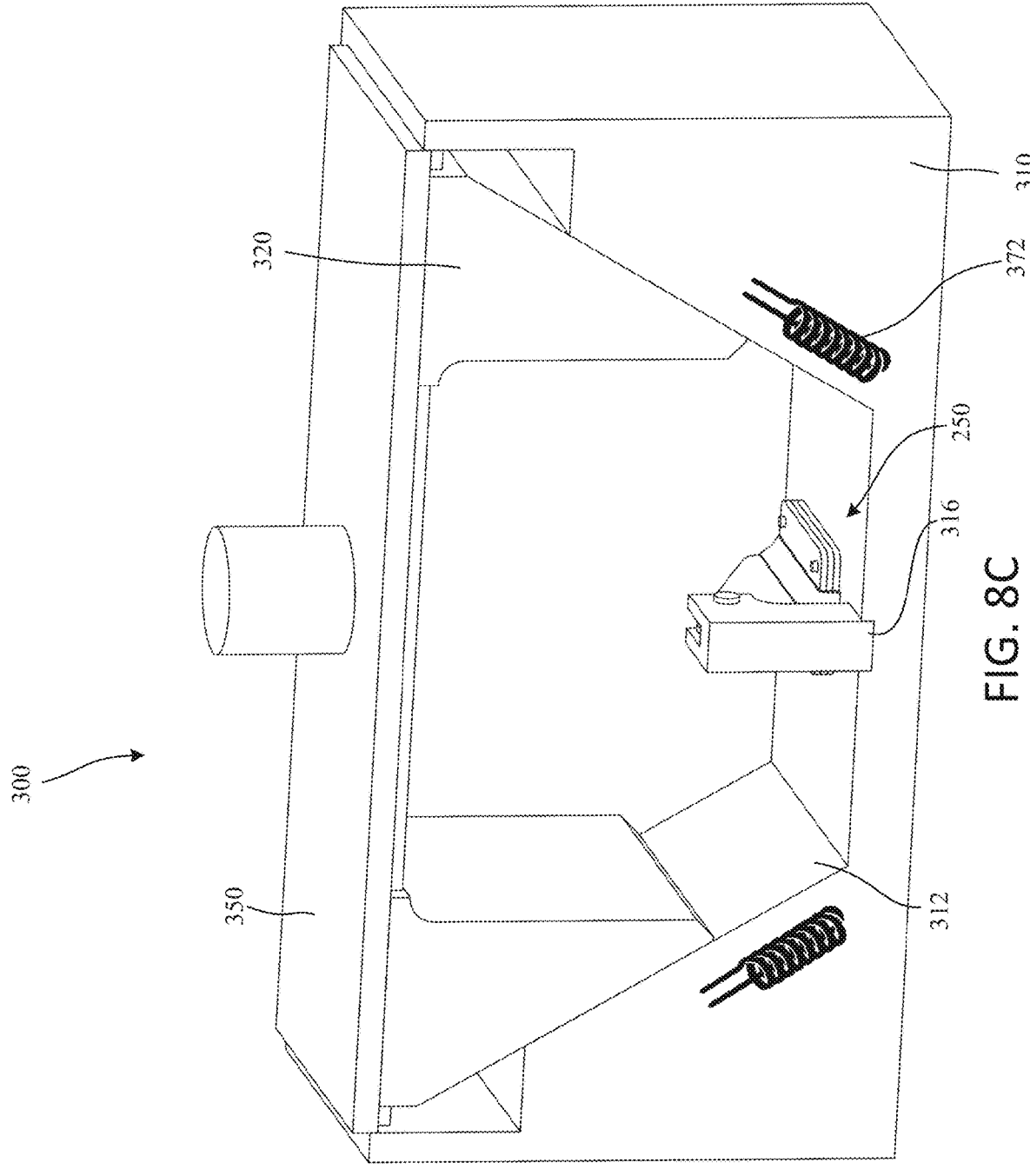
FIG. 8C illustrates a partial side perspective cutaway view of the component assembly, jig, and jig components of FIGS. 7A-B as inserted into an alternative compaction vessel in corresponding non-compacted and compacted states, the alternative compaction vessel having various alternative features in accordance with various aspects of the present invention.

In some such embodiments, as illustrated in FIG. 8A-B a jig assembly 240 can be provided which can include various support structures such as a support beam 270, and in some such embodiments can include one or more support rods 278 which can be configured to extend to or from an interior surface of the compaction vessel 310, the support rods 278 and support beam 270 can each be configured to maintain a relative position of a portion of the first component 4/204/ 224, second component 208/228 interfaced therewith, or component assembly 200/220/250. For example, the support beam 270 can include an interface portion 272 which mates to an opposing interface portion 254 of the component assembly 250 either directly or via a locking or interfacing mechanism 274. Further, for example the support rods 278 can be configured to extend through corresponding pinholes 258.

Figures 9A, 9B, 9C, 9D, 9E:
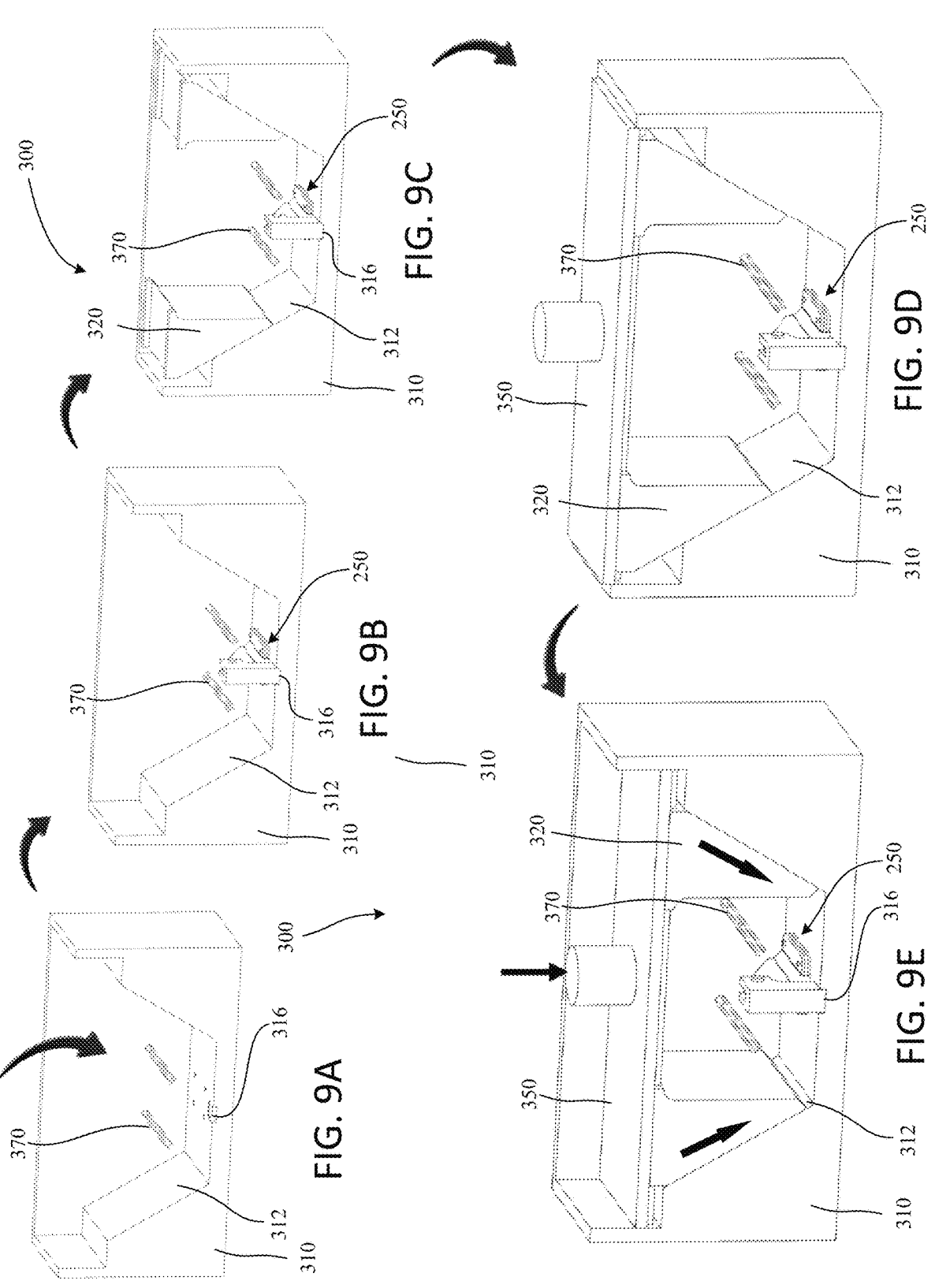
FIGS. 9A-E illustrate perspective partial cutaway views of the alternative compaction vessel of FIGS. 8A-B, component assembly, jig, and jig components of FIGS. 7A-B as inserted into the alternative compaction vessel of FIGS. 8A-B through various stages of preparation and compaction.

In some embodiments the support beam 270 or support rods 278 can be configured to interface with corresponding features provided in the side walls or bottom of the compaction vessel 310. For example, as illustrated in FIG. 9A, pinholes 314 can be configured to receive the support rods 278 in a relative position and the channel 316 can be configured to receive the support beam 270 such that transmission of the compaction force minimizes corresponding shifts in the granular support medium and thus minimizes distortion translated into the component or component assembly supported thereby.

FIGS. 9A-E also illustrate an alternative heating method in which heating elements 370 can instead be provided through a sidewall of the compaction vessel 310 such that the granular support medium can be heated internally.

In some additional embodiments an alternative compaction vessel can be provided such that interior surfaces thereof are provided with contours or jig components built in which are configured so as to provide support to predetermined portions of a component or component assembly contained within the compaction vessel during the steps of applying heat and applying the compaction force. In some such embodiments, the pressure plate can also be provided with corresponding contours so as to properly apply desired dynamics of the compaction force to the granular support medium with minimized distortion, or a desired distortion, thus similarly minimizing or optimizing a desired distortion translated from the granular support medium into the component or component assembly supported thereby.

Figures 10A, 10B:
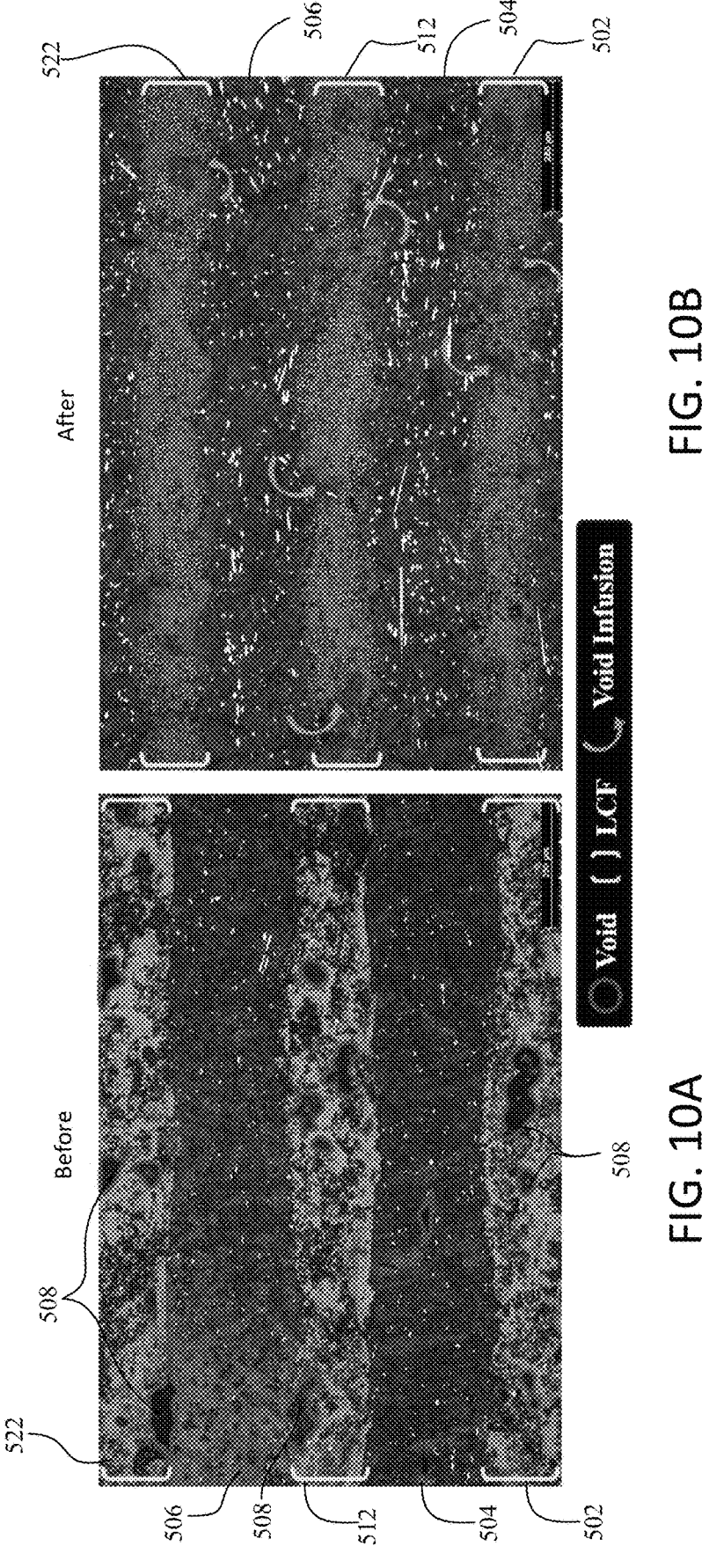
FIGS. 10A-B illustrate before and after side cutaway views of an actual component before and after planar layer re-fusion via the compaction and heating process of the present invention illustrating the ability of the process to heal cracks within the component.
Figures 11A, 11B:
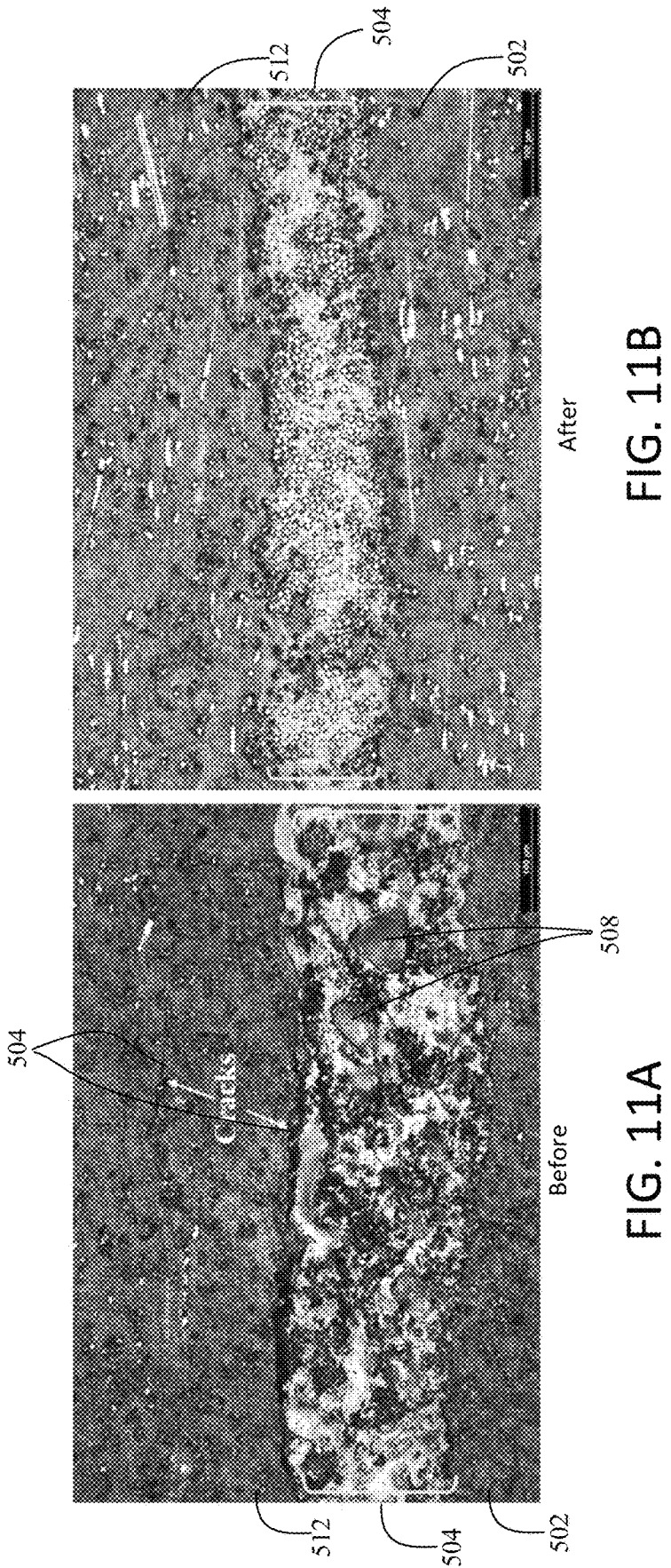
FIGS. 11A-B illustrate before and after side cutaway views of another actual component before and after re-fusion via the compaction and heating process of the present invention illustrating the ability of the process to eliminate micro-voids within the component.

FIGS. 10-11 illustrate actual cross sections of components and planar or deposition layers 502/512/522, illustrated here as thermoplastic with embedded long discontinuous carbon fiber (LCF), sandwiching or alternative layers of thermoplastics containing short discontinuous carbon fiber (SCF) 504 and 506, where FIGS. 10A and 11A particularly illustrate before compaction and heating, wherein there are cracks 504 and micro-voids 508 present in the layers and bonding regions in and between said planar or deposition layers. FIGS. 10B and 11B illustrate the same components after compaction and heating in accordance with methods of the present invention wherein the micro-voids and cracks are either healed, expressed, or otherwise substantially minimized. It will be appreciated that in some embodiments, and as shown here, certain planar or laminar layers can be formed utilizing long discontinuous carbon fiber, alternating with layers of short carbon fiber. Additionally, the various layers can merely be provided as alternating layers of SCF or LCF with the fibers oriented in different directions.

Additionally, and particularly in fused deposition manufacturing, utilizing fiber reinforced plastic filaments, it has been recognized that great structural benefit can be realized if various components of a component are fabricated separately with optimized orientation of the fiber reinforcement for each component, where a composite final component can then be fused together by utilizing the methods described above.

While discussed in some detail above, FIG. 12 explicitly illustrates a flow chart of an exemplary method 600 in accordance with various aspects of the present invention. It will then be appreciated that illustrated in this method are various steps wherein solid lines and arrows indicate a step sequence where solid lines indicate the typically required steps, wherein dotted lines indicate various steps that can be optionally incorporated thereinto. This method 600 can then include the following steps: providing at least one component, the component having been formed utilizing a simplified sub-manufacturing techniques such as planar or additive material process wherein the component includes a plurality of planar layers 602; Providing a compaction vessel 604; providing a first portion of granular support medium to the interior of the compaction vessel 606; placing the first component or component assembly into the first portion of granular support medium within the compaction vessel 608; an optional step of providing a jig within the compaction vessel, the jig being configured to support predetermined portions of any components or assemblies within the compaction vessel during the steps of applying heat and applying the compaction force 610.

In some embodiments the method can also include an optional step of providing a second portion of granular support medium to the interior of the compaction vessel so as to fully encompass the component(s) or assemblies however, the component can merely be added to a sufficiently previously provided amount of the granular support medium, or the granular support medium can be added to the compaction vessel after the component.

In any case, the method can then include: applying heat to the granular support and the first component within the compaction vessel 614; applying a compaction force in a first axial direction to the compaction vessel containing the first component and the granular support medium and second portion of granular support medium, wherein a combination of the compaction force and heat applied are sufficient to fuse one or more of the planar layers of the first component together 616; and another optional step of applying a multi-axial force to the first component or component assembly 618. This step is illustrated as being performed by providing and utilizing one or more wedges corresponding in shape to one or more sloped internal surfaces such that the step of providing a compaction force causes the wedges to travel radially inwardly toward the component or component assembly.

Similarly to any of the previous embodiments, such components and component assemblies can be placed into the compaction vessels and encompassed with the granular support medium. In some such embodiments the application of heat and application of the compaction force can then be utilized to fuse the first component and the second component together so as to cause the component assembly to become unitary.

In some preferred embodiments the components can be made of fiber reinforced plastics (FRP), wherein each component of a particular component assembly can have optimized planar or deposition directions so as to maximize the benefit of a particular orientation of the fibers within the plastics.

The proposed methods application of 3D pressure at high temperature in the region near $T_m$ (melting temperature), which therefore, can effectively reduce the number and size of micro-voids distributed in the bead's interface, while providing the desired release of the residual stresses introduced during the proposed process through visco-elastic relaxation during to the compaction stage. The polymer chain reptation can then be promoted by non-isothermal process allowing for crack healing. Such interdiffusion can be controlled with the selected time-temperature-pressure (t-T-p) regime, which can be tuned so as to allow not only healing of the internal material defects typical in additive manufacturing, but also allow for the joining of the dissimilar structural elements into a single component. This process, when properly balanced, also demonstrates significant stress relaxation behavior.

In some embodiments, modeling can be utilized to predict and optimize non-linear deformation during compaction stage of the proposed methods and systems.

As will be appreciated by those having ordinary skill in the art, and being in possession of this disclosure, the proposed process can be used to achieve improvement in the mechanical properties of compacted, heated and thus re-fused components as well as fusion together of complex multi-component assemblies which, by utilizing the systems and methods contained herein, can be compacted, heated, and re-fused, or assembled without undesired distortion, loss of shape. Further these components can be imbued with additional strength and interlayer bonding thus providing optimized or otherwise desired mechanical properties previously unachieved through additive material manufacturing. However, in order to efficiently incorporate the proposed process into the fabrication of components, the underlying mechanical behavior of the material utilized in the additive manufacturing process must be considered. Non-isothermal compaction and fusion bonding due to the selected (t-T-p) regime can produce the resulting mechanical behavior, which is dependent not only on the presence of microscopic additive manufacturing defects, but also changes to the material composition, such as fiber volume fraction redistribution and crystalline morphology.

For example, temperature can play a key role during the visco-elastic compaction, particularly in fiber reinforced plastic deposition, or FRP, as well as time dependent non-linear behavior of the granular support medium itself. In some embodiments, the granular support medium can act as a hyper-visco elastic medium such as talc powder, where the hyper elastic behavior is due to the reduced porosity as talc powder is compacted and the time dependent viscous response is due to relative movement of the talc, which results in the stress relaxation.

Furthermore, crystallization kinetics of thermoplastics is affected by the non-isothermal process. Depending on the preheating temperature, either complete or partial melting of the semi-crystalline fiber reinforced plastics is often realized which can then result in formation of crystalline bonds between planar or deposition layers.

To fully understand the processing-internal structure-property relationship in the proposed method requires careful consideration of pre-heating temperature and compaction pressure. These conditions can affect various material level phase-transitions that develop in thermoplastics, such as: (i) crystallization from the glassy state, (ii) crystallization from a partially molten state, as well as (iii) potential for transcristallinity to form around the fiber-matrix interface. Certain semi-crystalline thermoplastics exhibit various solid-state transitions that originate due to crystal-to-crystal transformations, such as (i) Brill transition that is observed in polyamides upon heating in 120-170° C., (ii) sub-melting point (sub-$T_m$) transition that occurs around 195-200° C., and (iii) limited re-crystallization from the amorphous phase. The crystalline phases can exhibit a combination of stable and metastable states. Since the contemplated processes often require relatively high temperatures, i.e. near or above melting temperature of thermoplastic, during compaction for the fusion bonding to take place, in can often result in significant phase induced transformations.

Therefore, the proposed method provides an opportunity to improve the mechanical properties, particularly those of thermoplastic FRP materials, through various transition mechanisms that develop through the fusion process to heal material defects, and smaller scale conversion of intermolecular and intramolecular hydrogen bonds of the polymer chain, resulting in formation of new crystalline structures. In this manner the use of compaction pressure can additionally influence the formation of multiple crystalline phases inside of thermoplastic matrix and at the interface with the fiber reinforcement, which is known as transcristallinity that can increase the desirous mechanical properties of the FRP materials.

Specifically, certain amount of recrystallization may be advantageous for improving mechanical properties of fiber reinforced thermoplastic composite material by controlling the degree of crystallinity. Annealing-induced shrinkage has been reported for thermoplastic composites and explained by the increased degree of crystallinity and decrease in anisotropic amorphous phase. In the context of fiber reinforced composite, re-crystallization, especially under applied compaction pressure, is needed to fuse the microscopic defects created by shrinkages in the part. Therefore, the original components should be designed to take into account this shrinkage by including slightly increased geometry that accounts on the amount of induced shrinkage of the component after the compaction and heating steps.

It is noted that, unless specified otherwise, no specific order is required in the aforementioned methods, though generally these method steps can be carried out sequentially.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention.

The invention claimed is:

1. A method of fabrication, the method comprising the steps of:

providing a first component, wherein the first component includes a plurality of planar layers;

providing a compaction vessel;

providing a granular support medium to an interior of the compaction vessel;

placing the first component into the granular support medium within the compaction vessel so as to fully encompass the first component within the granular support medium;

applying heat to the granular support and the first component within the compaction vessel, wherein a temperature within the compaction vessel is increased to or above a melting point of a material from which the first component is formed; and applying a compaction force in a first axial direction to the compaction vessel containing the first component and the granular support medium, wherein a combination of the compaction force and heat applied are sufficient to fuse one or more of the planar layers of the first component together.

2. The method of claim 1, wherein the granular support medium is a powder.

3. The method of claim 1, wherein the granular support medium is provided as talcum powder.

4. The method of claim 1, wherein the granular support medium is provided as silicate grains.

5. The method of claim 1, wherein the granular support medium is provided as metallic grains.

6. The method of claim 1, wherein the granular support medium has a melting temperature being greater than a melting point of a material utilized to form the first component.

7. The method of claim 1, wherein the compaction force is provided utilizing a hydraulic press.

8. The method of claim 1, wherein compaction vessel includes one or more sloped internal surfaces.

9. The method of claim 8, further comprising a step of providing one or more wedges corresponding in shape to the sloped internal surfaces such that the step of providing a compaction force causes the wedges to apply a multi-axial force to the first component.

10. A method of fabrication, the method comprising the steps of:

providing a first component, wherein the first component includes a plurality of planar layers;

providing a compaction vessel;

providing a granular support medium to an interior of the compaction vessel;

placing the first component into the granular support medium within the compaction vessel so as to fully encompass the first component within the granular support medium;

applying heat to the granular support and the first component within the compaction vessel;

applying a compaction force in a first axial direction to the compaction vessel containing the first component and the granular support medium, wherein a combination of the compaction force and heat applied are sufficient to fuse one or more of the planar layers of the first component together; and providing a jig within the compaction vessel, the jig being configured to support predetermined portions of the first component within the compaction vessel during the steps of applying heat and applying the compaction force.

11. The method of claim 10, wherein the jig is provided as one or more support rods extending from an interior surface of the compaction vessel, the support rods being configured to maintain a relative position of a portion of the first component.

12. The method of claim 1, wherein an interior surface of the compaction vessel is contoured.

13. The method of claim 1, further comprising:

providing a second component, wherein the second component includes a plurality of planar layers;

interfacing the second component with the first component so as to form a component assembly wherein the plurality of planar layers of the first component are oriented differently from the plurality of planar layers of the second component; and placing the component assembly into the granular support medium within the compaction vessel;

wherein the applying heat and applying of the compaction force are utilized to fuse the first component and the second component together so as to cause the component assembly to become unitary.

14. The method of claim 13, further comprising:
providing a jig within the compaction vessel, the jig being configured to support predetermined portions of the first component and the second component within the compaction vessel during the steps of applying heat and applying the compaction force.

15. The method of claim 14, wherein the jig is provided as one or more support rods extending from an interior surface of the compaction vessel, the support rods being configured to maintain a relative position of at least a portion of the second component relative to at least one portion of the first component.

16. The method of claim 13, wherein an interior surface of the compaction vessel is contoured.

16

* * * * *